Dec. 3, 1929.   D. M. ROTHENBERGER   1,738,320
ROTARY ENGINE
Original Filed May 9, 1921   3 Sheets-Sheet 1

Daniel M. Rothenberger INVENTOR

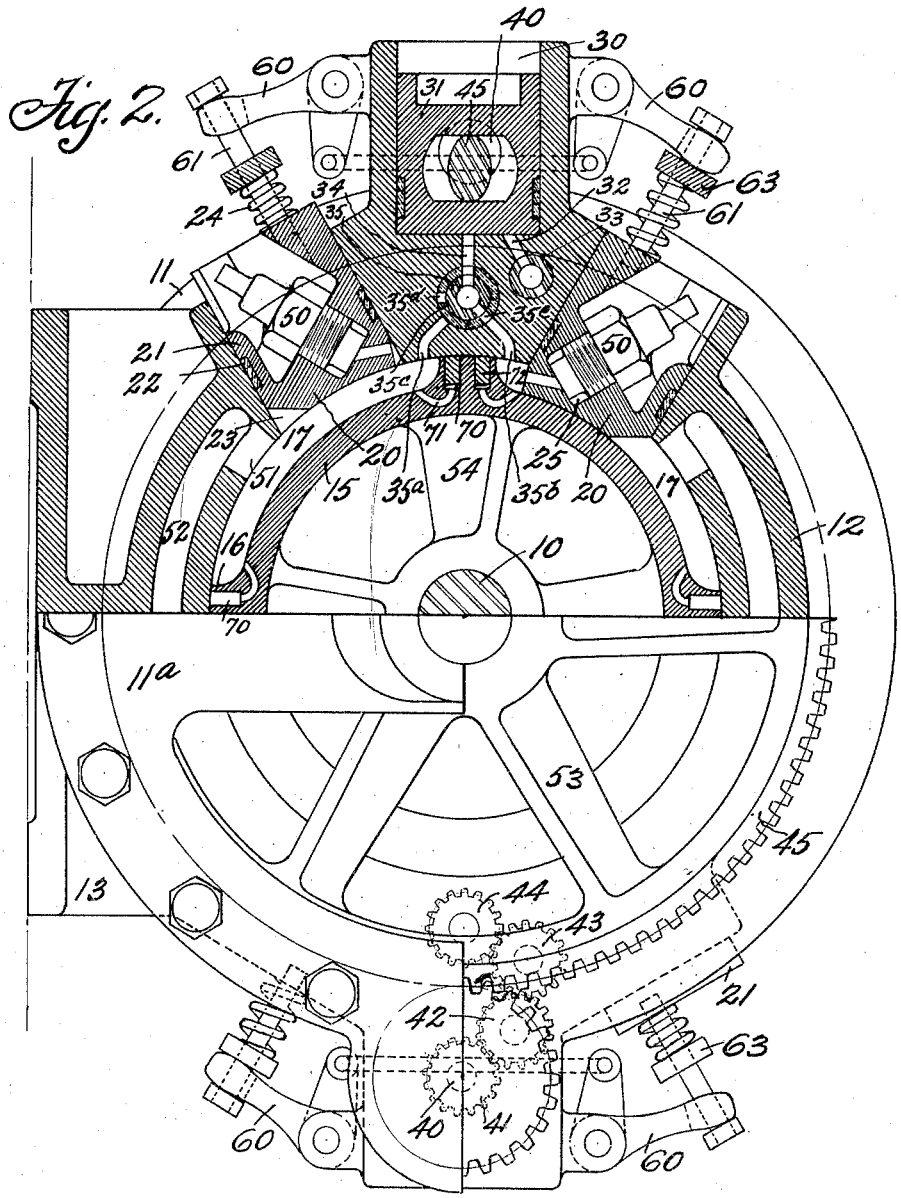

Dec. 3, 1929.   D. M. ROTHENBERGER   1,738,320
ROTARY ENGINE
Original Filed May 9, 1921   3 Sheets-Sheet 3
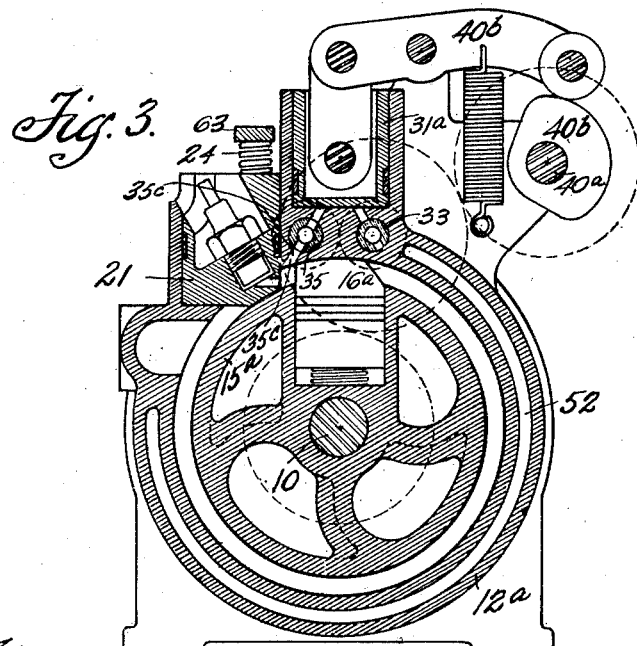
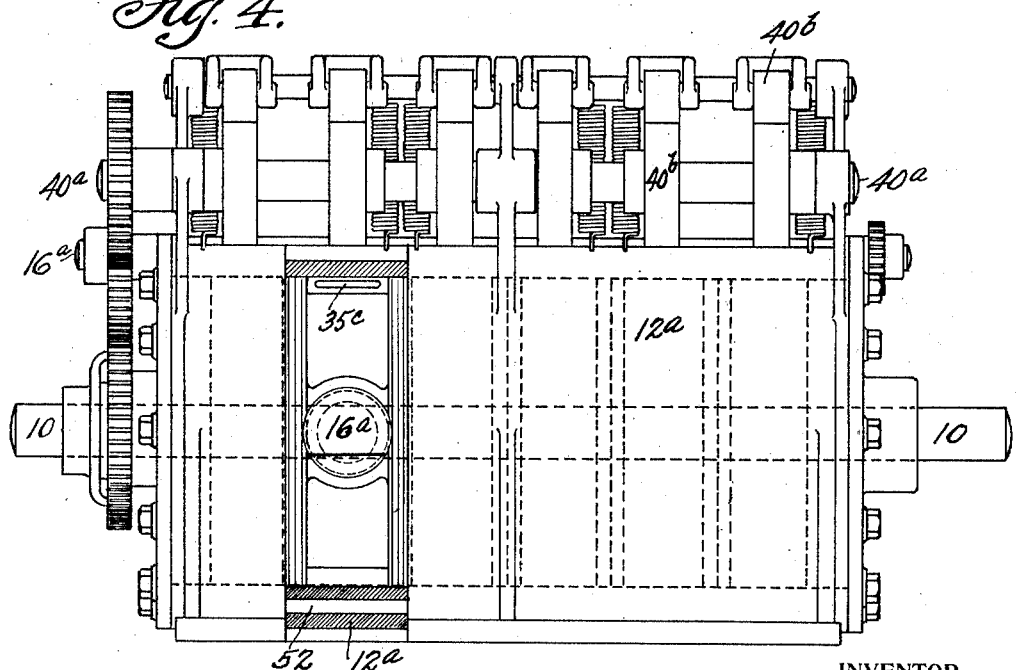
INVENTOR Patented Dec. 3, 1929

1,738,320

UNITED STATES PATENT OFFICE

DANIEL M. ROTHENBERGER, OF LEESPORT, PENNSYLVANIA

ROTARY ENGINE

Application filed May 9, 1921, Serial No. 467,796. Renewed July 21, 1928.

My invention relates particularly to rotary gas engines comprising a plurality of motor units arranged upon a single shaft and provided with peripheral charging mechanism; and my main objects are to provide in a simple and compact construction for the most effective utilization of the motive energy developed, for easy starting and reversibility as desired, and for the satisfactory packing and cooling of the wearing surfaces as required for economy of operation and maintenance. The invention is fully described in connection with the accompanying drawings and the novel features are clearly defined in the claims.

Fig. 2 is an end view, with a practical cross-section on the line 2—2 of Fig. 1.

Figs. 3 and 4 are similar views to Figs. 1 and 2 of a modified construction embodying certain features of the invention.

Figure 1:
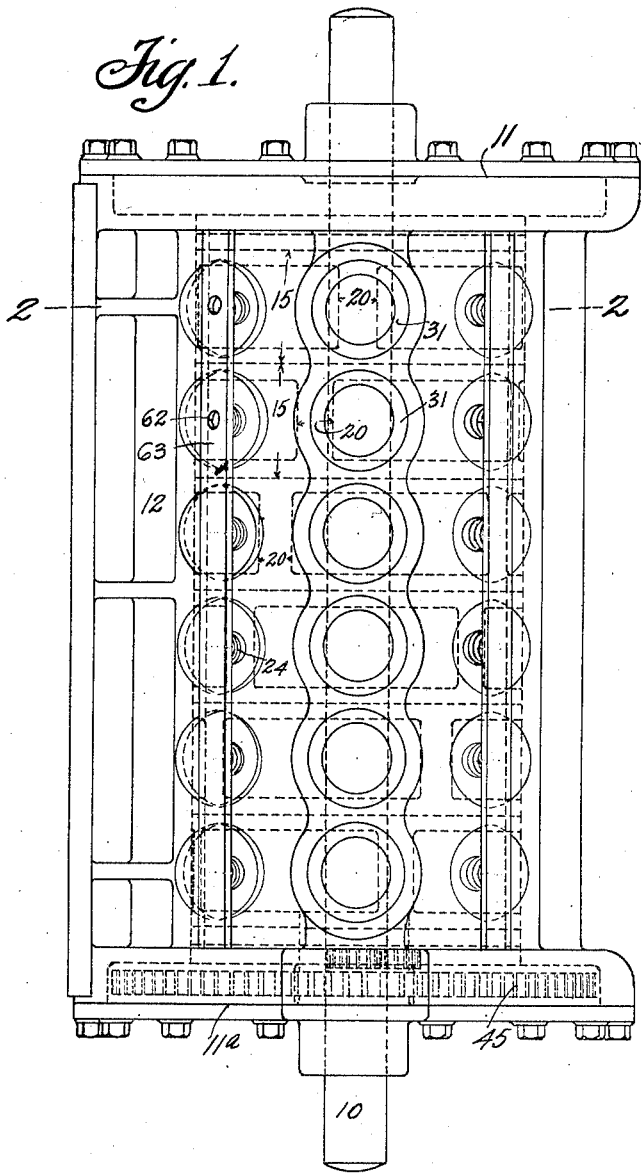
Fig. 1 is a plan view of a preferred embodiment of my invention, showing six cooperating motor units; the abutment-reversing levers being omitted.

The main shaft 10 of the engine illustrated, is mounted in the heads 11, 11$^a$ of an enclosing cylinder 12, which latter is provided with a base portion 13; said shaft 10 having secured thereto as shown a plurality of rotors which may be formed separately or in an integral group as desired, and said cylinder forming an enclosure for the group of rotors and being adapted to cooperate therewith to provide a series of coasting motor units as hereinafter described.

Each of these motor units thus comprises a rotor section 15 having preferably a plurality of piston projections 16, 16 forming the end closures of intervening circularly extending charge and explosion chambers 17, 17; the walls of the circular grooves which form these chambers serving to tightly seat the movable coacting abutment 20 of the enclosing cylinder 12.

The peripheral charging means provided for each motor unit comprises a compression chamber 30 extending radially outward from the enclosing cylinder and having therein a plunger 31; a supply port 32 to said compression chamber, for the operating medium, controlled by a rotary tubular valve 33 adapted to open and close said port; and a delivery port 34 from said compression chamber, communicating with a rotary tubular charge-valve 35 which controls the delivery of the charge to the annular explosion chambers 17. As shown in Fig. 2 this delivery port 34 is arranged to communicate with one or other of two branches 35$^a$ and 35$^b$ leading into the annular explosion chambers, by providing said tubular charge valve 35 with a concentric sleeve-valve 35$^c$ peripherally apertured at 35$^d$ and 35$^e$ so as to permit delivery from the inner peripherally apertured charge-valve 35 through either of said branches 35$^a$ or 35$^b$, as determined by proper relative movements of the charge valve 35 and its enclosing sleeve valve 35$^c$; the purpose of this preferred arrangement being to permit of reversing the rotation of the engine when desired.

The supply valve 33, and the charge valve 35, and the sleeve valve 35$^c$ for the latter as above described, each consists of a tube extending the full length of the engine and provided with peripheral apertures at different points in its length for the respective motor units; the location of such apertures being stepped circumferentially to correspond with the stepped arrangement of the rotor section 15 on the shaft 10, so as to provide for delivering compressed charges to the successive motor units in close succession as determined. This stepped arrangement insures continuous series of rotating impulses, serving to positively drive the shaft without fly-wheel control and with one or another charge ready at all times to be ignited for easy starting of the engine; and the operation of the several compression plungers 31, supply valves 33, charge valves 35, and sleeve valves 35$^c$ in alined arrangement, being effected jointly in proper relation. In Figs. 1 and 2 these compression and valve devices are shown as duplicated in diagonally opposite positions, and in accord with the shown provision of four piston projections 16 on each motor wheel section 15; and in the lower half of said figure gearing employed to cooperatively drive the same is indicated. The operating shafts 40, 40 for the compression plungers 31 are jointly rotated, and each drives its coacting supply-valve tube 33 and charge-valve tube 35 in proper unison through gear wheels 41, 42, 43, 44; separate provision not indicated, being made for setting the sleeve valve 35ᶜ as is required only for reversing the rotation of the engine. As shown in Fig. 2 the compression plungers 31 are directly operated by cams 45 on the shaft 40, these being fixed to the latter at varying angles as required for the several motor units.

Each of the movable abutments 20 comprises a cylindrical plunger portion 21 provided with packing rings 22 and movable in the cylinder chamber 23, and having the abutment projection 20 on its inner end normally tightly seated in the circumferential grooves forming the annular charge and explosion chambers 17, by a spring 24 arranged to press the same inward. Within a passage-way 25 in each plunger, opening therethrough to one side of its abutment portion 20, is located a spark plug 50 operative as usual to explode a determined charge, the plunger, and the guide way therefor, extending circumferentially of the annular chambers 17 a considerably greater distance than the depth of the latter, as indicated.

As each rotor section is turned by the force of an exploded charge operating upon a piston projection 16 thereof, a following piston projection forces backward the plunger abutment 20 of the cylinder for repetition of the charging and exploding action; and the spent gases of combustion are discharged through an inner wall exhaust aperture 51 into an annular exhaust chamber 52 of the enclosing cylinder. To quickly and effectively carry off these gases and properly cool the cylinder I provide upon the shaft 10, at each end of the cooperating motor units, a fan 53, respectively operative as force and suction fans to effect these purposes; said fans being made part of the main drive gear 45, as shown, by merely providing the latter with fan-vane spokes 53; and a like cooling action for the rotors particularly, is provided by forming the same hollow for free passage of the cooling air, and by providing the same with similar fan-spokes 54.

For reversing the rotation of the engine, it is necessary to fixedly retract one or other of each of the two pairs of abutment plungers 21 provided for in Fig. 2, and for this purpose I indicate cooperatively arranged levers 60, 60, each engaging an abutment plunger stud 61, extending through a spring 24 and an aperture 62 in the fixed spring-seat bars 63, so as to retain one of each pair of sliding abutments in retracted position while leaving the other free to be retracted by the passing wheel projections 16 against the projecting action of its spring 24.

To provide for effectively preventing leakage at each piston projection 16, I form these with packing recesses 70, 70, severally arranged in communication through passage-ways 71, 71, and provide in each such recess a removably fitted packing strip 72 adapted to be tightly seated against the enclosing cylinder wall by pressure of the gases of combustion conveyed through said passage-ways 71; any wear upon said packing strips being thus automatically taken up so as to insure uniform contact, and the strips being readily renewable when needed.

The economy of construction, operation and maintenance provided for by my improved construction as described, may be secured in large degree with modifications of the preferred embodiment specifically set forth; as is indicated by the particular modifications illustrated in Figs. 3 and 4, in which the construction is simplified by eliminating the provision for reversing the rotation of the engine, and the duplication of parts for most effectively developing power, and in which a retracting form of wheel abutment 16ᵃ is shown, and an indirect driving of the compression plungers 31ᵃ from a separate cam shaft 40ᵃ operative through pivoted levers 40ᵇ. The terms of the claims are intended to include such modifications as are within the spirit of the invention set forth.

What I claim is:

1. In a rotary engine comprising a single shaft provided with a series of cooperating rotors, and an enclosing cylinder having corresponding series of annular chambers; compressor plunger chambers each having separate inlet and delivery ports the latter extending to one of said annular chambers; a longitudinally mounted rotary tubular valve in said cylinder for each series of ports; an abutment guide-way communicating with each of said annular chambers: a spring-pressed sliding abutment in each of said guide-ways having an interiorly mounted spark-igniter and a spark-way therefrom communicating with the corresponding annular chamber adjacent the feed port thereto; and means for successively actuating the co-operating parts.

2. In a rotary engine comprising a single shaft provided with a series of cooperating concentric rotors, and enclosing cylinder having corresponding series of annular chambers; a compressor plunger chamber for each of said annular chambers having a valve controlled inlet port thereto and a branched delivery port therefrom adapted to communicate with the adjacent annular chamber on opposite sides of a rotor piston when said piston is positioned midway said delivery port; a control valve for the branched port of each compressor chamber comprising independently operable concentric tubes having determinedly positioned feed apertures; and sliding abutments positioned on opposite sides of said branched port and either of which is adapted to be held in inoperative position as determined by the desired direction of rotation.

In testimony whereof I affix my signature.

DANIEL M. ROTHENBERGER.